United States Patent [19]

Evans

[11] 4,097,806
[45] Jun. 27, 1978

[54] ADAPTIVE EQUALIZER WITH IMPROVED DISTORTION ANALYSIS

[75] Inventor: John Brian Evans, Plano, Tex.

[73] Assignee: Xerox Corporation, Stamford, Conn.

[21] Appl. No.: 672,108

[22] Filed: Mar. 31, 1976

[51] Int. Cl.² .......................................... H04B 1/12
[52] U.S. Cl. ...................................... 325/42; 325/67
[58] Field of Search .................. 325/42, 67, 65, 63, 325/320, 323, 324, 325, 302, 304; 333/18; 324/57 R, 57 N

[56] References Cited

U.S. PATENT DOCUMENTS

| | | | |
|---|---|---|---|
| 3,375,473 | 3/1968 | Lucky | 333/18 |
| 3,505,471 | 4/1970 | Stone | 325/42 |
| 3,758,881 | 9/1973 | Rummler | 325/65 |
| 3,798,576 | 3/1974 | Torpie | 325/42 |
| 3,914,691 | 10/1975 | Meadors | 333/18 |
| 4,025,719 | 5/1977 | Nussbaumer | 325/42 |
| 4,027,258 | 5/1977 | Perreault | 325/42 |

Primary Examiner—Benedict V. Safourek
Assistant Examiner—Michael A. Masinick

[57] ABSTRACT

A receiving terminal for a switched analog data communications system is equipped with an adaptive equalizer which is adjusted on a single pass in response to a series of test pulses transmitted during a predetermined equalizer adjustment period.

21 Claims, 10 Drawing Figures

ADAPTIVE EQUALIZER WITH IMPROVED DISTORTION ANALYSIS

BACKGROUND OF THE INVENTION

This invention relates to equalizers for data communications systems and, more particularly, to adaptive equalizers for analog systems which rely on switched transmission media.

Data communications systems often employ transmission media having undesirable frequency dependent envelope delay (sometimes referred to herein as "phase") and attenuation distortion characteristics. Typically, the amount of transmission distortion the data suffers in such a system increases as a function of frequency. Consequently, as the data transmission rate is increased, successful data recovery ordinarily becomes increasingly dependent on there being adequate provision to compensate for or otherwise overcome such distortion.

Equalizers are commonly included in the receiving terminals of analog data communications systems to compensate for the transmission distortion. An extra dimension is, however, added to the problem of selecting an appropriate equalizer for a system which relies on a switched transmission medium, such as the public switched telephone network, inasmuch as it is generally impossible to accurately predict the level and frequency characteristics of the phase and attenuation distortion which will be encountered. Instead, the usual starting point in selecting an equalizer for such a system is to assume that the transmission distortion will lie somewhere within a predetermined range.

With the limitation in mind, it will be understood that there is a potentially serious data recovery problem in modern, high speed, analog facsimile systems and the like. As is known, the public switched telephone network is a favored transmission medium for facsimile communications. However, the reduced document transmission times of the newer analog facsimile systems, such as those which are based on the Telecopier 200 transceiver manufactured and sold by Xerox Corporation, are capable of being realized at acceptably low data error rates only if there is reasonably close compensation for the transmission distortion the data suffers. As will be appreciated, the Xerox Telecopier 200 transceiver is a good example of the problem because of its document transmission times of approximately 2 and 3 minutes for standard 8½ inches × 11 inches originals.

Others have previously recognized that the foregoing problem can be solved by using a so-called "adaptive equalizer" which is automatically adjusted to more or less complement the transmission distortion the data suffers. Indeed, substantial effort and expense have been devoted to the development of equalizers of that type, and some of the proposals have shown substantial promise, including the one described and claimed in a commonly assigned Torpie et al U.S. Pat. No. 3,798,547, which issued on Mar. 19, 1974, for an "Automatic Equalization Method and Apparatus." Nevertheless, there still is a need for a relatively economical and reliable adaptive equalizer which is substantially immune to the potentially disturbing effects of ordinary line noise.

SUMMARY OF THE INVENTION

Accordingly, an object of this invention is to provide an improved adaptive equalizer for switched data communications systems. A more detailed, related object is to provide a relatively reliable method and means for adjusting an adaptive equalizer in the presence of ordinary line noise.

More particularly, in keeping with one of the more important aspects of the present invention, an object is to provide a method and means for adjusting and equalizer on a single pass, whereby the time allotted to testing and comparing the compensating performance of different equalizer settings may be maximized within the constraints imposed by a finite equalizer adjustment period. In other words, an object is to provide a method and means for identifying and selecting an optimum setting for an adaptive equalizer on the basis of a single cut and try-type trial run through the available equalizer settings.

Furthermore, in accordance with another of the important aspects of this invention, a further object is to provide a reliable method and means for identifying the optimum setting for an adaptive equalizer.

In even more detail, an object of the present invention is to provide an adaptive equalizer of the foregoing type for use in analog facsimile systems and the like.

Briefly, to carry out these and other objects of this invention, a receiving terminal for a switched analog data communications system is equipped with an adaptive equalizer which is adjusted on a single pass in response to a series of test pulses transmitted during a predetermined equalizer adjustment period. To that end, different settings for the equalizer are serially tested and compared during the equalizer adjustment period in response to a series of unique codes, and a memory is selectively updated to store the code for the equalizer setting which best compensates for the transmission distortion the test pulses suffer. After the available settings are tested, the stored code is retrieved from the memory to adjust the equalizer to the optimum setting.

As disclosed herein, the above-outlined routine applies to the adjustment of the envelope delay or phase compensating stage of a two-stage adaptive equalizer. The adjustment of the phase compensation stage is of special interest for that reason and for the additional reason that the difference between the average peak amplitude of the test pulses and the accompanying ripple voltage component is monitored while the different possible settings for that stage are being tested to reliably identify the optimum setting. Nevertheless, it should be understood that certain of the underlying concepts of the adjustment routine apply equally as well to single-stage equalizers and to other multistage equalizers.

BRIEF DESCRIPTION OF THE DRAWINGS

Still further objects and advantages of this invention will become apparent when the following detailed description is read in conjunction with the attached drawings, wherein.

DETAILED DESCRIPTION OF THE ILLUSTRATED EMBODIMENT

While the invention is described in some detail hereinbelow with specific reference to a single embodiment, it is to be understood that there is no intent to limit it to that embodiment. On the contrary, the aim is to cover all modifications, alternatives, and equivalents falling within the spirit and scope of the invention as defined by the appended claims.

Figure 1:
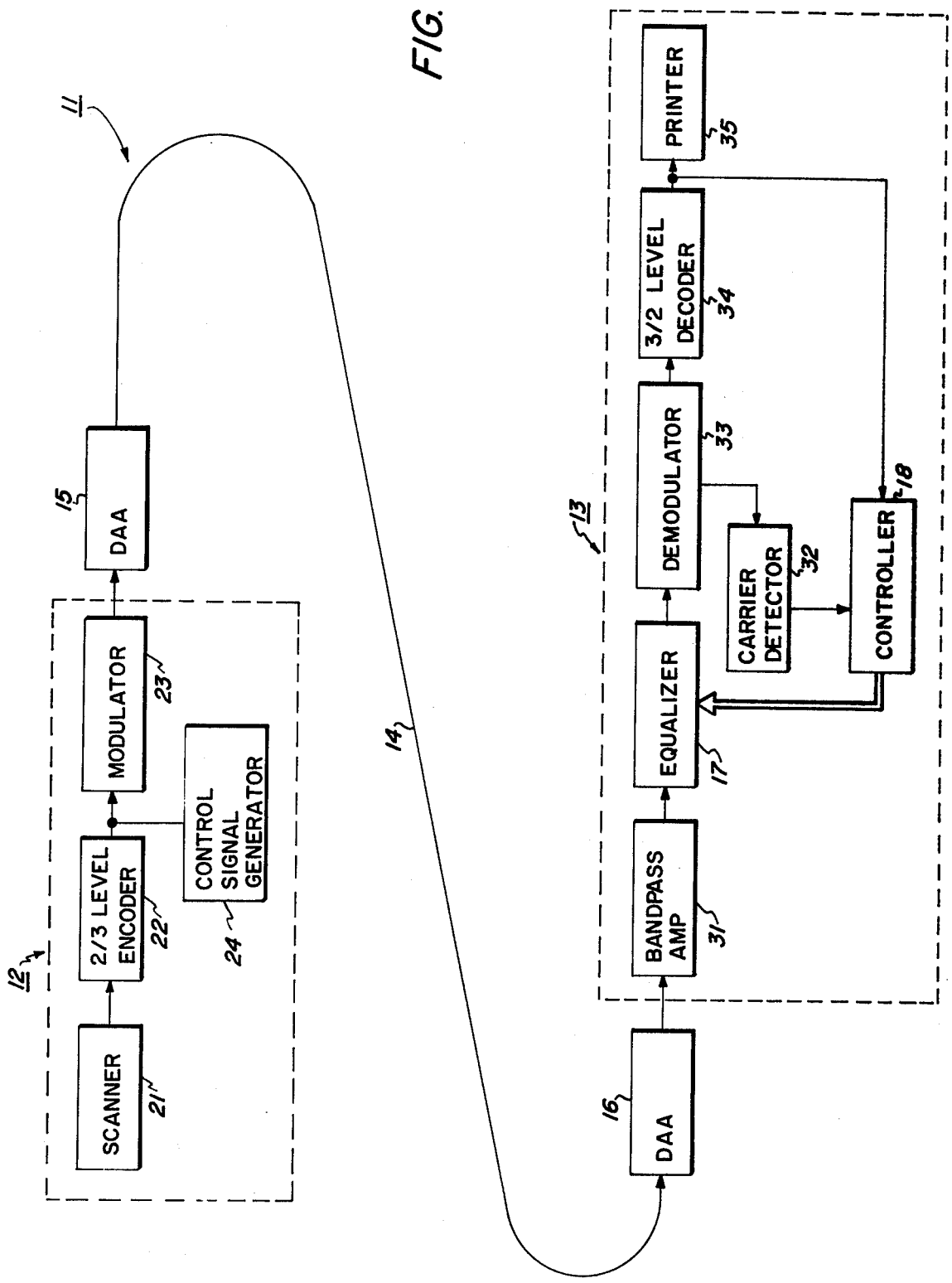
FIG. 1 is a simplified block diagram of an analog facsimile system having a receiving terminal including an adaptive equalizer embodying the present invention.

Turning now to the drawings, and at this point especially to FIG. 1, the invention is here disclosed in the context of an analog facsimile system 11 having a transmitting terminal 12 and a receiving terminal 13 which are interconnected on say, a demand basis by a limited bandwidth transmission channel 14. Typically, the transmission channel 14 is furnished by the public switched telephone network. Thus, in keeping with standard practices, suitable data access arrangements 15 and 16 are shown for interfacing the transmitting terminal 12 and the receiving terminal 13, respectively, with the transmission channel 14.

As will be appreciated, the facsimile system 11 is a convenient example of an analog data communications system in which the present invention may be advantageously utilized. Indeed, apart from the equalizer 17 and the equalizer controller 18 of this invention, the transmitting and receiving terminals 12 and 13 are configured to closely correspond to the aforementioned Xerox Telecopier 200 transceiver. Hence, a functional level description of those terminals will suffice because anyone interested in further details may refer to the commercially available equipment and the published literature pertaining thereto.

Reviewing the transmitting terminal 12 on that level, it will be seen that it comprises a scanner 21 for converting the information content of a subject copy (not shown) into a baseband video signal. That signal is then encoded by a two-to-three level alternate analog encoder 22, and the encoded signal is, in turn, applied to the input of a modulator 23. There the encoded video is combined with several different handshaking signals which are supplied by a control signal generator 24 to satisfy a predetermined communications protocol. Accordingly, the modulator 23 modulates a carrier signal in accordance with the encoded video signal and the handshaking signals, thereby supplying a passband signal suitable for transmission to the receiver 13 via the transmission channel 14. For example, a frequency modulation technique is utilized in the Xerox Telecopier 200 transceiver.

At the receiving terminal 13, the passband signal is first applied to a bandpass amplifier 31 in the interest of increasing its level and improving its signal-to-noise ratio. Next comes the equalizer 17 which is adjusted under the control of the controller 18, as more fully explained hereinafter, to compensate for the transmission distortion the passband signal suffers. From there the passband signal is routed to a demodulator 33 and from there to a carrier detector 32. In keeping with standard practices, the carrier detector 32 responds to the presence and absence of carrier energy to supply a control signal for activating and deactivating the receiver 13 as each incoming transmission is initiated and completed, respectively. The demodulator 33, on the other hand, cooperates with a series connected three-to-two level decoder 34 in recovering the baseband video signal and the handshaking signals which are then applied to the controller 18 and to a printer 35.

While the communications protocol for the facsimile system 11 need not be considered in depth to gain a complete understanding of this invention, it is noteworthy that there is a predetermined equalizer adjustment period at the outset of each transmission to the receiving terminal 13 during which the so-called handshaking signals take the form of a series of equalizer training pulses. For example, the protocol for the Telecopier 200 transceiver may be employed. In that event, the video processing is delayed to provide, among other things, an equalizer adjustment period of approximately 2.33 seconds during which the control signal generator 24 generates equalizer training pulses having an amplitude of about eight volts and a duration of roughly 0.5 millisecond/pulse at a repetition rate of nearly 200 pulses/second. Moreover, the modulator 23 frequency modulates a 2120 Hz. carrier signal in response to those pulses, whereby the passband signal carries the training pulses as isolated cycles of 2440 Hz. energy which are separated from one another by ten cycles worth of 2120 Hz. energy. As will be appreciated, the equalizer 17 is adjusted in response to those training pulses, and the printer 35 then generates the desired facsimile copy in response to the baseband video signal and certain of the other handshaking signals, which, of course, are relatively distortion free.

Figure 2:
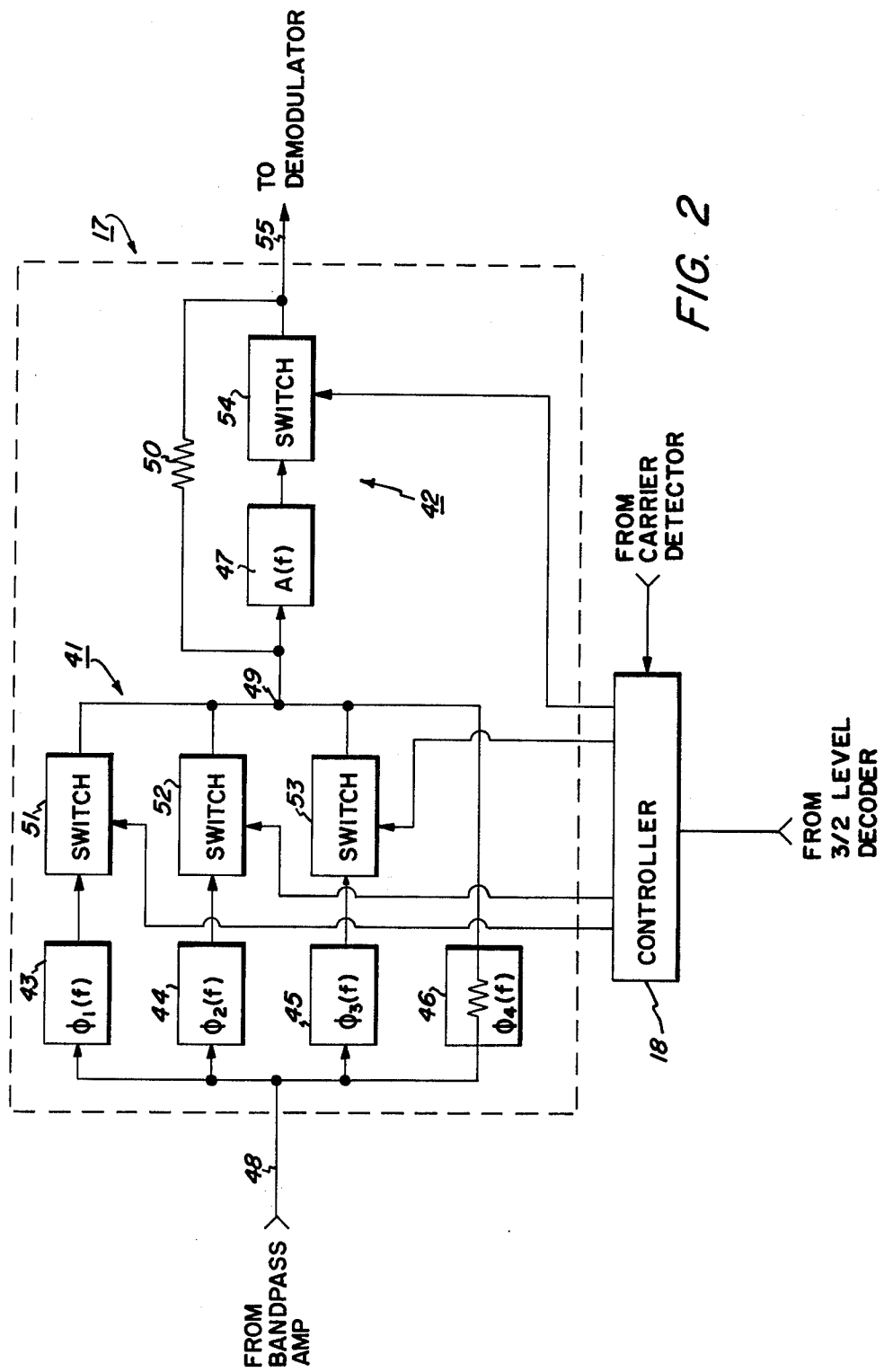
FIG. 2 is a more detailed block diagram of the equalizer.

Referring to FIG. 2, the equalizer 17 preferably is a multistage unit having a phase compensating stage 41, and an attenuation compensating stage 42. As illustrated, the phase compensating stage 41 comprises a plurality of delay networks 43–46 which have different phase versus frequency characteristics, and the attenuation compensating stage 42 comprises an attenuation compensating network 47 which has a predetermined gain versus frequency characteristic. Accordingly, provision is made for the controller 18 to route the passband signal through a selected one of the delay networks 43–46 and through or around the attenuation compensating network 47.

More particularly, the delay networks 43–46 are connected in separate parallel paths between the equalizer input 48 and an intermediate node 49. Furthermore, connected in series with the delay networks 43–45 there are normally open switches 51–53, respectively, which are controlled by the controller 18 to route the passband signal through a selected one of the delay networks 43–46. To avoid the extra expense and complexity of having a similar switch (not shown) connected in series with the other delay network 46, the networks 43–45 are each selected to have an output impedance which is appreciably lower (say, two orders of magnitude or more) than the output impedance of the delay network 46.

The amplitude compensating stage 42 permits of a similar configuration inasmuch as a single switch 54, which is controlled by the controller 18, suffices to selectively route the passband signal through or around the attenuation compensating network 47. To accomplish that, the attenuation compensating network 47 has its input coupled to the node 49 and its output coupled to the equalizer output 55 via the switch 54. Node 49 is also coupled to the equalizer output 55 via a parallel path comprising a relatively large resistor 50. As a result, the passband signal is routed around the network 47 when the switch 54 is open and through the network 47 when the switch 54 is closed. Preferably, the value of the resistor 50 is at least two orders of magnitude greater than the impedance of the network 47.

Figure 3:
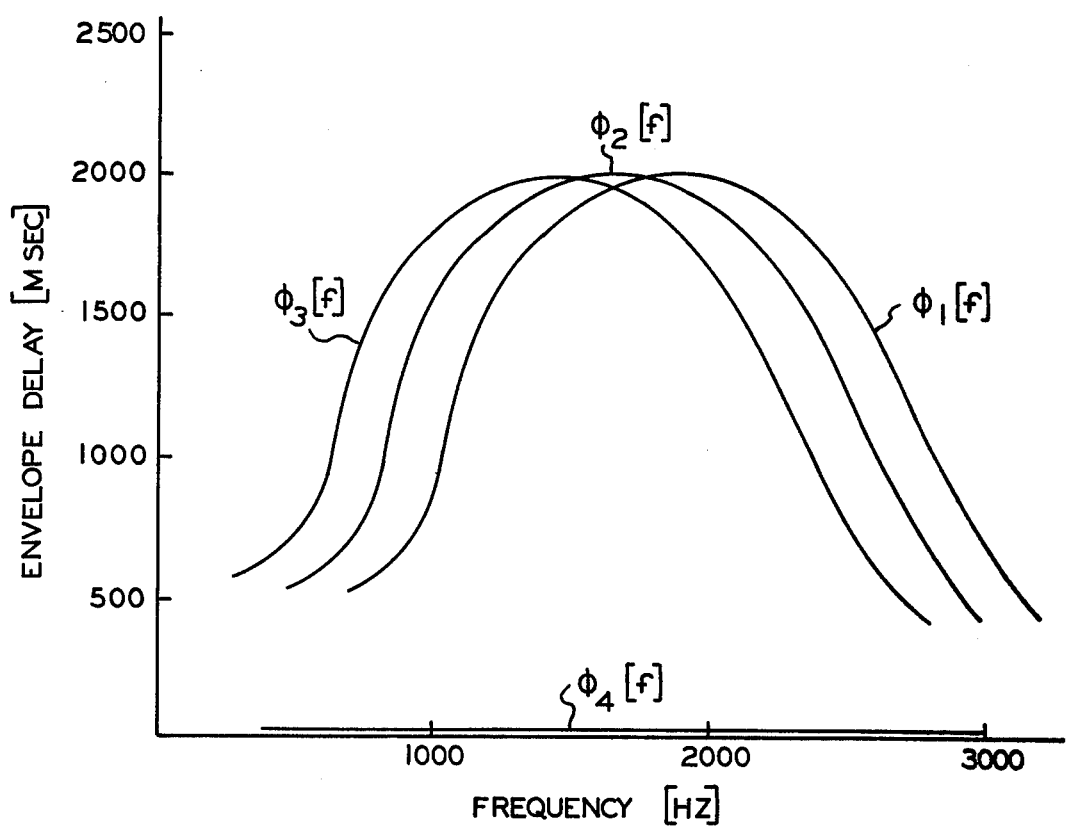
FIG. 3 illustrates typical envelope delay versus frequency characteristics for the delay networks in the phase compensating stage of the equalizer.
Figure 4:
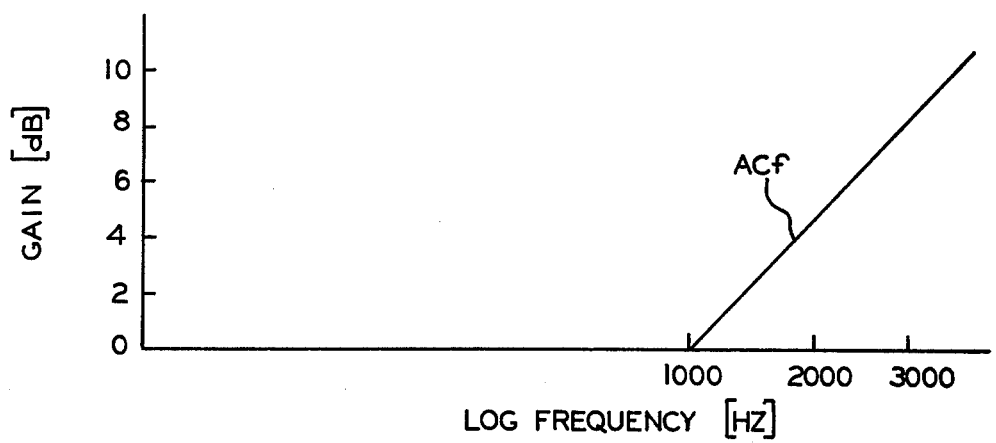
FIG. 4 illustrates a typical gain versus frequency characteristic for the network in the attenuation compensating stage of the equalizer.

Ideally, the envelope delay versus frequency characteristics of the delay networks 43–46 are selected to more or less span the complement of the range of envelope delay distortion the transmission medium is likely to exhibit. For that reason, as indicated in FIG. 3, the characteristics of the delay networks 43–46 have been tailored in this instance with the public switched telephone network in mind to complement the "high," "average," "low," and "negligible" phase distortion cases, respectively. The same basic considerations govern the selection of the gain versus frequency characteristic for the attenuation compensating network 47. However, there is only one such network and, therefore, is desirably is tailored, as depicted in FIG. 4, to complement an upper middle to upper value within the range of attenuation distortion the transmission medium is expected to cause. Compensation for the lower to lower middle range of attenuation distortion desirably is elsewhere continuously included in the passband signal path (by means not shown).

Figure 5:
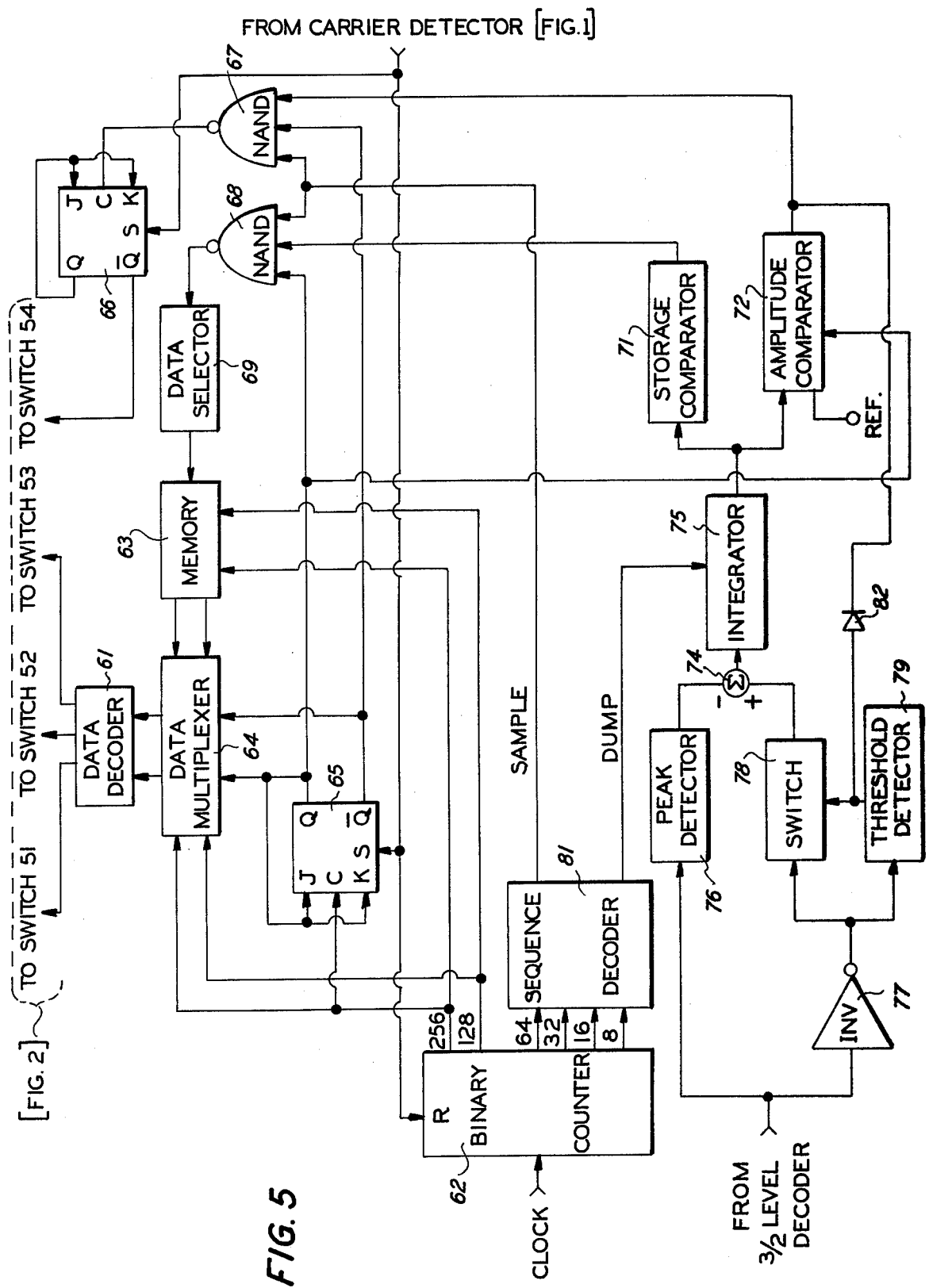
FIG. 5 is a block diagram of the controller provided in accordance with this invention for adjusting the phase and attenuation compensating stages of the equalizer.

Keeping FIGS. 1 and 2 in mind while focusing on FIG. 5, in accordance with this invention, the controller 18 carries out a cut and try-type process during the equalizer adjustment period to identify and select the optimum setting for the equalizer 17 on a single pass. To simplify the process, the phase and amplitude compensating stages 41 and 42 of the equalizer 17 are sequentially adjusted. Hence, the passband signal is initially routed around the attenuation compensating network 47 while the delay networks 43–46 are being serially tested to identify and select the one which best compensates for the envelope delay distortion caused by the transmission channel 14. Thereafter, the passband signal is routed through the optimum or selected delay network 43, 44, 45 or 46 while another test is performed to determine whether the amplitude compensation offered by the attenuation compensating network 47 is called for or not.

More particularly, for adjusting the phase compensating stage 41 of the equalizer 17, the controller 18 comprises a data decoder 61 for supplying the control signals for the switches 51-53 in response to coded input signals selectively derived from a binary counter 62 or a memory 63 by means of a data multiplexer 64. A J-K flip-flop 65 has its Q and $\overline{Q}$ outputs coupled to control the data multiplexer 64, whereby the input signals for the data decoder 61 are taken from the counter 62 when the flip-flop 65 is in a first or set state and from the memory 63 when the flip-flop 65 is in a second or reset state. Furthermore, the counter 62 is incremented at a predetermined rate by locally generated clock pulses (supplied by means not shown), and the bits appearing at its more significant outputs (e.g., those representing counts of 128 and 256) are fed to the memory 63 and the data multiplexer 64 to supply a series of codes which uniquely identify the different delay networks 43–46. Of course, only two outputs of the counter 62 are required for that purpose in this embodiment because a pair of bits yield four possible combinations of logic levels (i.e., 00, 01, 10 and 11) to serve as the so-called codes.

For adjusting the attenuation compensating stage 42, the controller 18 further comprises another J-K flip-flop 66 which has its $\overline{Q}$ output coupled to supply the control signal for the switch 54. Accordingly, the passband signal is routed around the attenuation compensating network 47 when the flip-flop 66 is in its first or set state and through the network 47 when the flip-flop 66 is in its other or reset state.

Figure 6:
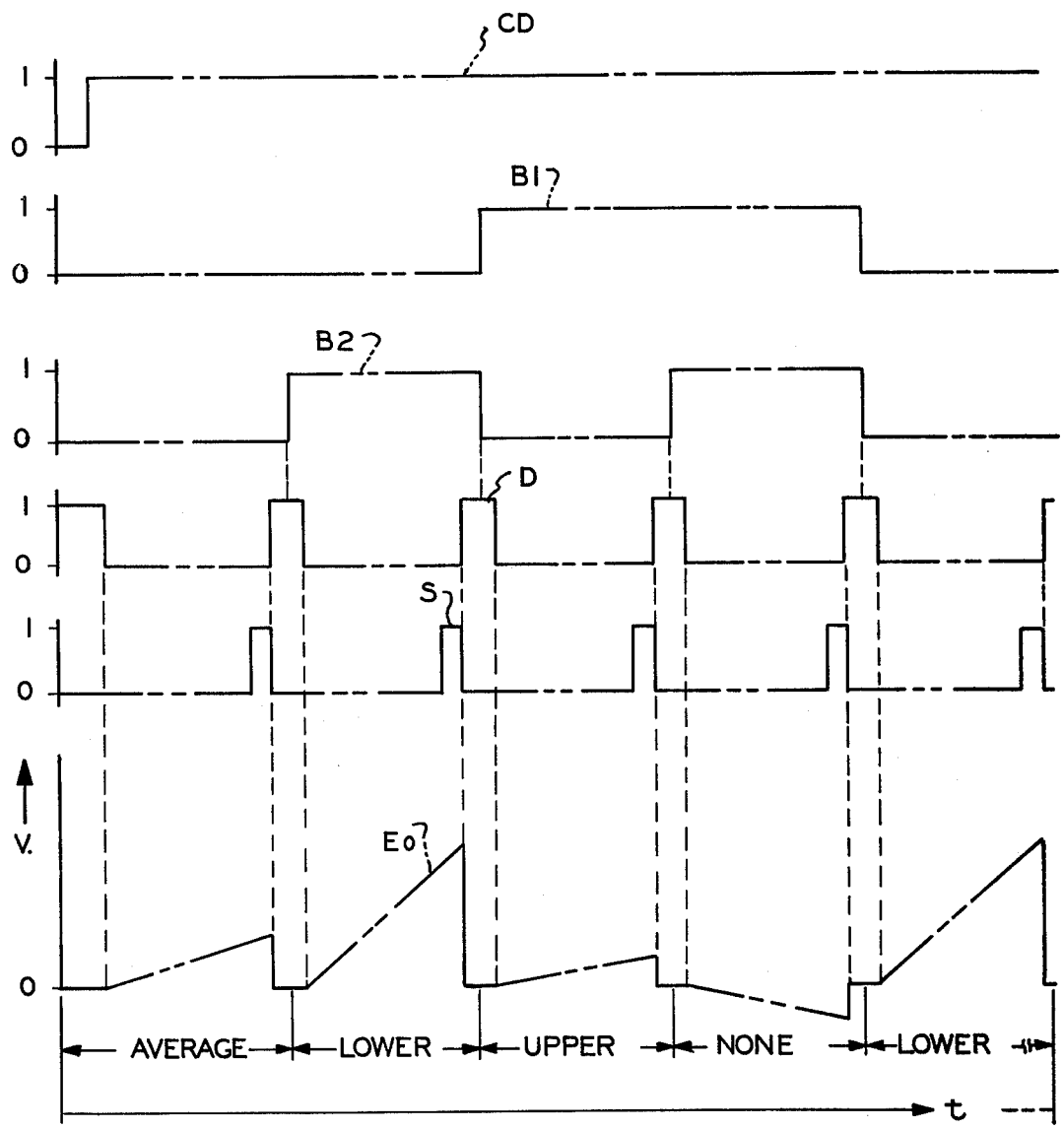
FIG. 6 is a basic timing diagram for the controller.

As will be recalled, the initial portion of each transmission to the receiving terminal 13 is reserved to provide an equalizer adjustment period. Conveniently, the start of that period is marked for the controller 18 by the output signal CD (FIG. 6) supplied by the carrier detector 32 since that signal is characterized by being at, say, a low ("0") logic level in the absence of carrier energy and at an opposite or high ("1") logic level in the presence of carrier energy. To take advantage of that, the output of the carrier detector 32 is coupled to a reset input R of the counter 62 and to direct set inputs S of the flip-flops 65 and 66. Therefore, the counter 62 is cleared and the flip-flops 65 and 66 are restored to their set states as the carrier detector output signal CD drops from a high ("1") logic level to a low ("0") logic level at the conclusion of each transmission to the receiving terminal 13, thereby preparing the controller 18 for the next transmission. When that transmission is initiated, the output signal CD from the carrier detector 32 returns to its high ("1") logic level, whereby the counter 62 starts to accumulate a count and the flip-flops 65 and 66 are subjected to clock control. In other words, the controller 18 is triggered into operation at that point to carry out the equalizer adjustment process.

It will also be recalled that the equalizer adjustment process involves serially testing the delay networks 43–46 more or less independently of the attenuation network 47 to identify and select the one which most effectively compensates for the phase distortion caused by the transmission 14 and then performing another test with the selected delay network 43, 44, 45 or 46 in place to determine whether the amplitude compensation offered by the attenuation network 47 is beneficial or not. To carry out those steps in that sequence, the flip-flop 66 has its Q output returned to its J and K inputs and its clock input C coupled to the output of a NAND gate 67 which, in turn, has one input coupled to the $\overline{Q}$ output of the flip-flop 65. Another NAND gate 68 has its output coupled to the control input of the memory 63 via a data selector 69 and one of its inputs coupled to the Q output of the flip-flop 65. Furthermore, the flip-flop 65 has its Q output returned to its J and K inputs and its clock input C coupled to the most significant output of the counter 62 (e.g., the output representing a count of 256).

Consequently, the flip-flop 65 is maintained in its set state during the first part of the equalizer adjustment period and, therefore, its Q and $\overline{Q}$ outputs are held at high ("1") and low ("0") logic levels, respectively. Hence, the data multiplexer 64 initially causes the data decoder 61 to supply the control signals for the switches 51-53 in response to the logic levels of the bits B1 and B2 (FIG. 6) appearing at the more significant outputs (e.g., those representing counts of 256 and 128, respectively) of the counter 62. Since the counter 62 is incremented at a predetermined rate by the aforementioned clock pulses, the logic level of one or both of those bits B1 and B2 periodically changes, thereby generating an appropriate series of codes (i.e., 00, 01, 10 and 11) for causing the decoder 61 to sequentially insert the delay networks 43-46 into the passband signal path on a trial basis.

While that is taking place, the NAND gate 67 is unconditionally enabled by the low ("0") logic level signal at the $\overline{Q}$ output of the flip-flop 65. Thus, the flip-flop 66 is also maintained in the set state to hold the control signal for the switch 54 at a low ("0") logic level so that the passband signal is routed around the attenuation network 47. The NAND gate 68, on the other hand, is conditionally disabled because of the high ("1") logic level of the signal at the Q output of the flip-flop 65 so that the memory 63 may be selectively updated under the control of a storage comparator 71, as explained in further detail hereinbelow, to store the code for the delay network 43, 44, 45 or 46 which is found to most effectively compensate for the phase distortion caused by the transmission channel 14.

After all of the delay networks 43-46 have been tested, the count accumulated by the counter 62 ultimately reaches an overflow level such that its most significant output bit B1 drops from a high ("1") logic level to a low ("0") logic level. At that point, the flip-flop 65 is clocked into its reset state, thereby causing its Q output to drop to a low ("0") logic level and its $\overline{Q}$ output to go to a high ("1") logic level. Under those conditions, the data multiplexer 64 applies the code stored in the memory 63 to the data decoder 71, whereby the switches 51-53 are driven to insert the optimum delay network 43, 44, 45 or 46 into the passband signal path for the balance of the transmission. Of course, no further changes in that code are allowed because the NAND gate 68 is unconditionally enabled by the low ("0") logic level signal at the Q output of the flip-flop 65. However, the NAND gate 67 is now conditionally disabled by the high ("1") logic level signal at the $\overline{Q}$ output of the flip-flop 65, thereby permitting the flip-flop 66 to be clocked into its reset state under the control of an amplitude comparator 72, as also described in more detail hereinbelow, should it later be found that the amplitude compensation offered by the attenuation network 47 is called for.

As is known, the idealized (i.e., distortion free) baseband response of a limited bandwidth transmission channel to a pulse-like input signal $x$ is a sin $x/x$ function in the time domain. Experience has demonstrated that it is costly and difficult to directly measure the sin $x/x$ content of distorted pulses, but there are approximation techniques for more or less quantifying the transmission distortion caused by such a transmission channel on the basis of the baseband response of the channel to a series of test pulses. Chief among those techniques is, probably, the one which relies on so-called peak-to-average ratio (PAR) measurements of the baseband pulse response.

In accordance with one of the more detailed features of this invention, it has been found that an even more reliable approximation of the phase distortion caused by a limited bandwidth transmission channel is provided by performing suitably weighted peak-to-average rectified difference (PARRD) measurements on the baseband response of the channel to applied test pulses, such as the equalizer training pulses. The available data leads to the conclusion that the average rectified ripple is ideally given about five times as much weight as the peak pulse amplitude in making those measurements. As here disclosed, this new approximation technique is relied on to identify and select the optimum setting for the phase compensating stage 41 of the equalizer 32, but it will be evident that the underlying concept is of much broader utility. Indeed, taking a broad view, it will be recognized that an improved method and means are provided for quantifying the phase distortion caused by a limited bandwidth transmission channel.

Figure 7:
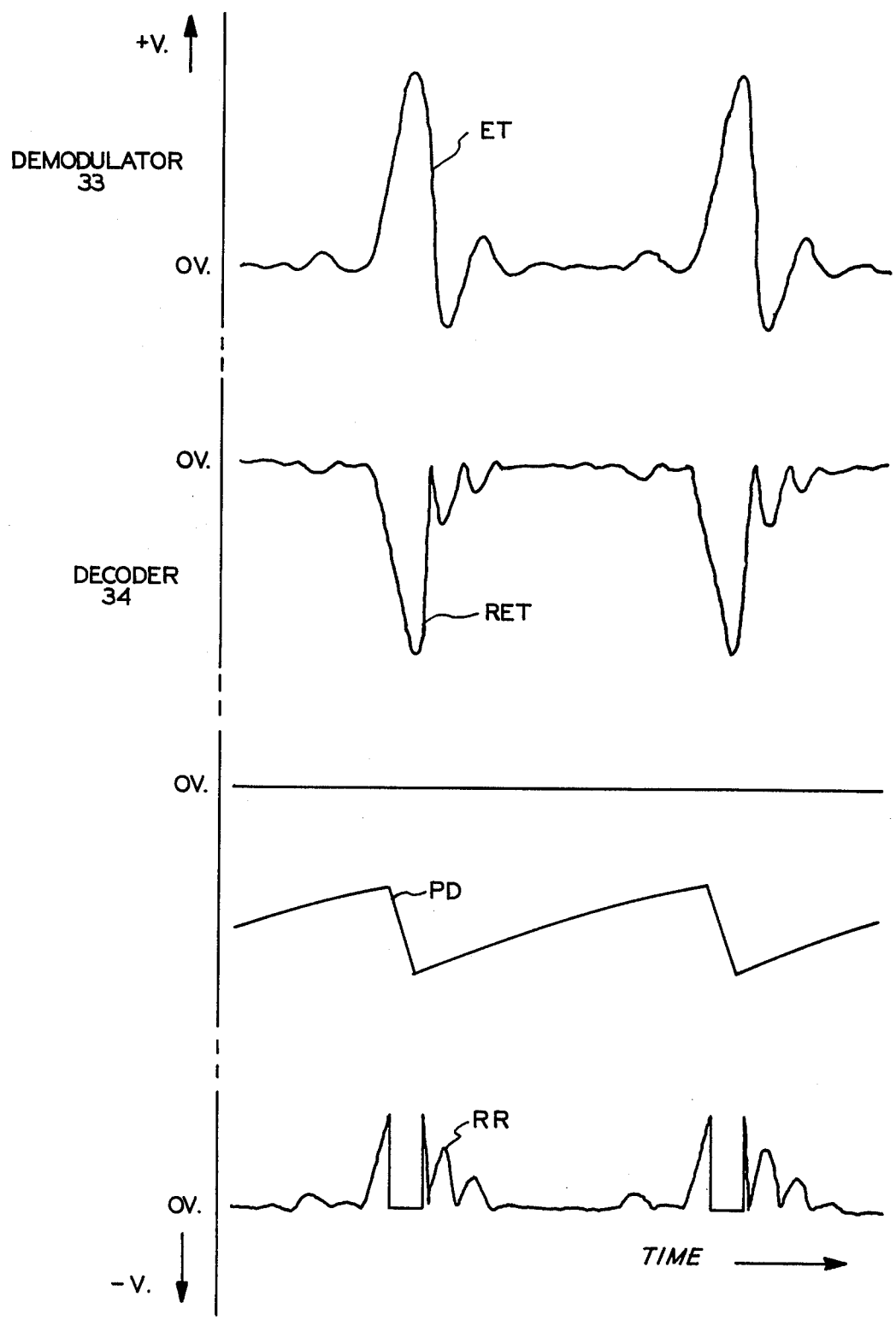
FIG. 7 illustrates waveforms appearing at various points within the controller as a function of time.

Turning for a moment to FIG. 7, it will be seen that the baseband equalizer training pulses ET recovered by the demodulator 33 during the equalizer adjustment period each characteristically comprise a reasonably well defined main lobe of predetermined polarity and bipolar ripple component. The three-to-two level decoder 34 happens to be an inverting full wave rectifier, and it, therefore, responds to the training pulse ET by supplying an output signal RET having the main lobes of the training pulses in inverted form and the ripple components in rectified or unipolar form.

Accordingly, returning to FIG. 5, to quantify the peak and the rectified ripple components of the training pulses ET, the output of the three-to-two level decoder 34 is coupled to a summing node 74 at the input of an integrator 75 by a pair of parallel circuits. One of those circuits is defined by a peak detector 76, and the other includes an inverter 77 and a series connected switch 78 which is controlled by a threshold detector 79. The purpose of the peak detector 76 is to feed a current PD (FIG. 7), which is substantially proportional to the peak amplitude of the training pulses, into the summing node 74 with a first polarity. For that reason, the peak detector 76 is suitably configured to have a time constant which is approximately twice as long as the period of the equalizer training pulses so that it tends to follow normal peak-to-peak variations in the main lobes of the training pulses, but not the inter-pulse ripple or noise. In contrast, the inverter 77 and switch 78 are responsible for feeding a current RR (FIG. 7), which is more or less proportional to the ripple, into the summing node 74 with a second or opposite polarity. To that end, the threshold detector 79 is connected to open and close the switch 78 as the output of the inverter 77 swings above and below, respectively, a threshold selected to just exceed the peak magnitude of the pre-shoots and post-shoots which normally straddle the main lobes of the training pulses ET. That usually can be achieved by setting the threshold voltage for the threshold detector 79 at roughly one-half the nominal voltage level expected of the training pulses at the output of the demodulator 33 under ideal, distortion-free conditions. For example, if the nominal voltage level for those pulses is specified or otherwise given as being +8 volts, the threshold voltage is typically selected to be +4 volts or so.

In keeping with the envelope delay distortion approximation technique of the present invention, the peak current PD and the rectified ripple current RR are suitably weighted and algebraically combined at the summing node 74 to provide a charging current for the integrator 75. Since the peak current PD and the rectified ripple current RR have opposite polarities, the integrator 75 responds to the charging current by supplying an output voltage $E_o$ (FIG. 6) which increases as a function of time with a slope proportional to the weighted peak-to-average rectified ripple difference exhibited by the training pulses ET. In other words, the slope of the integrator output voltage $E_o$ is an inverse function of the envelope delay distortion acting on the training pulses ET. The sensitivity of the slope of the integrator output voltage $E_o$ to changes in the envelope delay distortion is largely dependent on the relative weights given to the peak current PD and the rectified ripple current RR in making the weighted peak-to-average rectified ripple difference measurements. Thus, it is worth repeating that the information on hand indicates that the rectified ripple current RR should be given approximately five times as much weight as the peak current PD to optimize the approximations.

Summarizing, it is noted that phase distortion readings could be based on either the slope or the amplitude of the integrator output voltage $E_o$; it being understood, of course, that the amplitude is a meaningful measure of the distortion affecting the training pulses ET if a predetermined amount of time is allotted to the charging of the integrator 75. As will be appreciated, ordinary line noise may introduce spurious components into the integrator output voltage $E_o$. For that reason, amplitude based envelope delay distortion measurements are generally favored since the effects of channel noise are averaged over the period allotted to each measurement and the noise contribution to successive measurements is more or less the same.

Here the aim is not to obtain phase distortion readings per se, but instead to identify the delay network 43, 44, 45 or 46 which best compensates for the phase distortion caused by the transmission channel 14. To accomplish that, as illustrated, the integrator 75 is periodically discharged or cleared in preparation for testing each of the different delay networks 43-46, whereby the integrator 75 more or less independently measures the phase distortion still affecting the training pulses ET recovered by the demodulator 33 while each of the delay networks 43-46 is in place in the passband signal path of the equalizer 32 on a trial basis. The counter 62 allots a predetermined amount of time to the testing of each of the delay networks 43-46. Thus, to identify the delay networks 43, 44, 45 or 46 which most effectively compensates for the phase distortion caused by the transmission channel 14, the storage comparator 71 compares the existing amplitude of the output voltage $E_o$ from the integrator 75 against a dynamic reference level which tracks the peak amplitude of the integrator output voltage $E_o$. As a result, the storage comparator 71 supplies the NAND gate 68 with an input signal which is at a high ("1") or a low ("0") logic level depending on whether the existing integrator output voltage $E_o$ is above or below, respectively, its prior peak level. In short, the storage comparator 71 sequentially measures the relative effectiveness of the delay networks 43-46, thereby ultimately identifying the one which best compensates for the phase distortion caused by the transmission channel 14.

For selectively updating the memory 63 to store the code for the optimum delay network 43, 44, 45 or 46, a high ("1") logic level sampling signal S (FIG. 6) is periodically applied to the NAND gate 68 as the test period allotted to each of the delay networks 43-46 is about to expire. Whenever one of the delay networks 43-46 is found to be more effective in compensating for the phase distortion caused by the transmission channel 14 than those that have been tested theretofore, the NAND gate 68 is disabled in response to the sampling signal S, thereby causing the data selector 69 to issue an update command to the memory 63, whereby any code previously stored in memory 63 is dumped in favor of the code for the more effective delay network 43, 44, 45 or 46.

Advantageously, the counter 62 has complete responsibility for the timing of the equalizer adjustment process. Therefore, the sampling signal S for the NAND gate 68 and a discharge or dump signal (FIG. 6) for the integrator 75 are supplied by a sequence decoder 81 in response to the bits appearing at the less significant outputs of the counter 62 (e.g., those representing counts of 8, 16, 32 and 64).

As will be recalled, the optimum delay network 43, 44, 45 or 46 is selected when the flip-flop 65 is clocked into its reset state since the data multiplexer 64 then applies the code stored in the memory 63 to the data decoder 61. That code is not subject to any further changes because the Q output of the flip-flop 65 is held at a low ("0") logic level, whereby the NAND gate 68 is unconditionally enabled. The $\bar{Q}$ output of the flip-flop 65, is however, at a high ("1") logic level, thereby conditionally disabling the NAND gate 67 in readiness for clocking the flip-flop 66 into its reset state should it be found that the attenuation compensation offered by the attenuation compensating network 47 is called for.

To determine whether the attenuation compensating network 47 is called for or not, the average peak amplitude of the training pulses ET recovered by the demodulator 33, while the optimum delay network 43, 44, 45 or 46 is in the passband signal path of the equalizer 32, is compared by the amplitude comparator 72 against a predetermined reference voltage. Since, in this case, high attenuation distortion causes an increase in the amplitude of the demodulated training pulses, the reference voltage is selected to distinguish unacceptably high amplitude distortion cases from acceptably low ones. For example, if the nominal voltage level for the training pulses ET is given, consistently with a prior example, as being +8 volts, the reference level for the comparator is suitably selected to be approximately +8.7 volts. To accommodate the NAND gate 67, the amplitude comparator 72 is configured to provide a high ("1") or a low ("0") logic level output signal depending on whether the average peak amplitude of the training pulses ET is above or below the reference voltage. Consequently, if an unacceptably high level of amplitude distortion is encountered, the output of the amplitude comparator 72 goes to a high ("1") logic level which, in turn, causes the NAND gate 67 to be disabled in response to the sampling signal from the sequence decoder 81, thereby clocking the flip-flop 66 into its reset state so that the attenuation network 47 is then inserted into the passband signal path of the equalizer 32.

Some savings are obtained by using the peak detector 76 and the integrator 75 to supply the amplitude comparator 72 with an input signal corresponding to the average peak amplitude of the training pulses ET. Hence, provision is made for open circuiting the switch 78 independently of the threshold detector 79 once the optimum delay network 43, 44, 45 or 46 has been selected. To that end, the output of the amplitude comparator 72 is returned to the control input of the switch 78 through a diode 82 which is reversely or forwardly biased depending on whether the output of the amplitude comparator 72 is at a high ("1") or a low ("0") logic level, respectively. Moreover, the Q output of the flip-flop 65, which is coupled to a control input of the amplitude comparator 72, is held at a high ("1") logic level while the phase compensating stage 41 is being adjusted. Under those conditions, the diode 82 is reversely biased, thereby placing the switch 78 under the control of the threshold detector 79. When, however, the flip-flop 65 is clocked into its reset state, the output of the comparator 72 drops to a low ("0") logic level, thereby forwardly biasing the diode 82 to seize control of the switch 78.

Returning for a moment to the counter 62, it may be helpful to observe that changes in the logic levels of its more significant bits (viz., those taken from the outputs representing counts of 128 and 256) effectively divide the equalizer adjustment period into a plurality of cycles and that changes in the logic levels of its less significant bits (viz., those taken from the outputs representing counts of 8, 16, 32 and 64) further divide each of those cycles into a series of time slots. To achieve a reasonable degree of immunity from errors that might otherwise be caused by ordinary line noise, it is desirable to take the repetition rate of the training pulses into account when selecting the clock rate and capacity of the counter 62 so that there are roughly thirty to sixty training pulses/cycle of the equalizer adjustment process. Additionally, to prevent the switching transients, which occur when the delay networks 43-46 are switch into and out of the passband signal path of the equalizer 32, from upsetting the measurements taken to identify the optimum delay network 43, 44, 45 or 46, the first few time slots of each cycle are preferably reserved for, say, discharging the integrator 75. Thus, as illustrated, there are 64 time slots/cycle, and the sequence decoder 81 is configured to provide a dump signal D for the integrator 75 during the first four and last four time slots of each cycle. That more or less dictates that the sequence decoder 81 also respond to the penultimate set of, say, four time slots of each cycle, to provide the sampling signal S for the NAND gates 67 and 68.

Figure 8A:
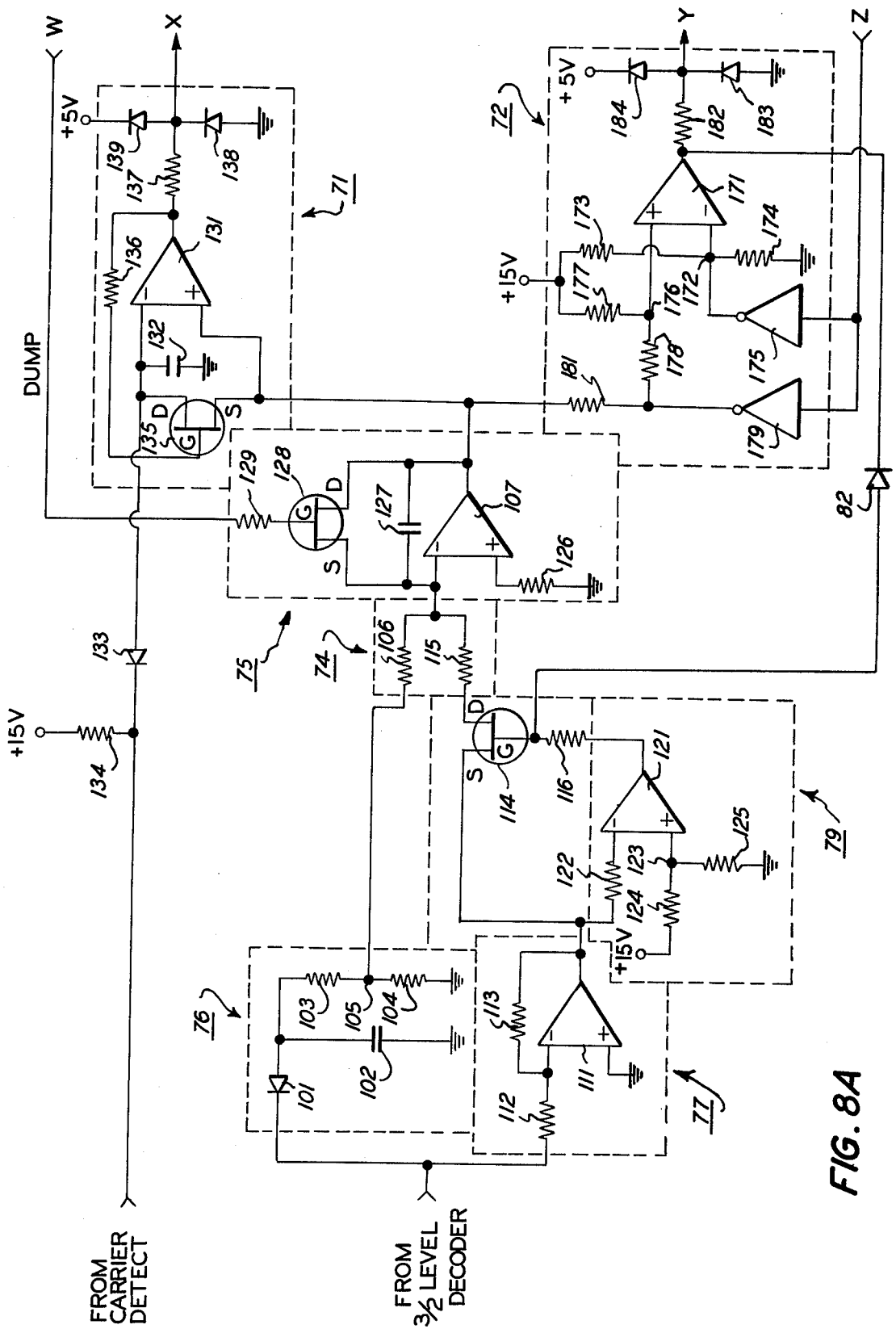
FIGS. 8A and 8B, when joined as indicated, form a simplified schematic diagram of the controller.
Figure 8B:
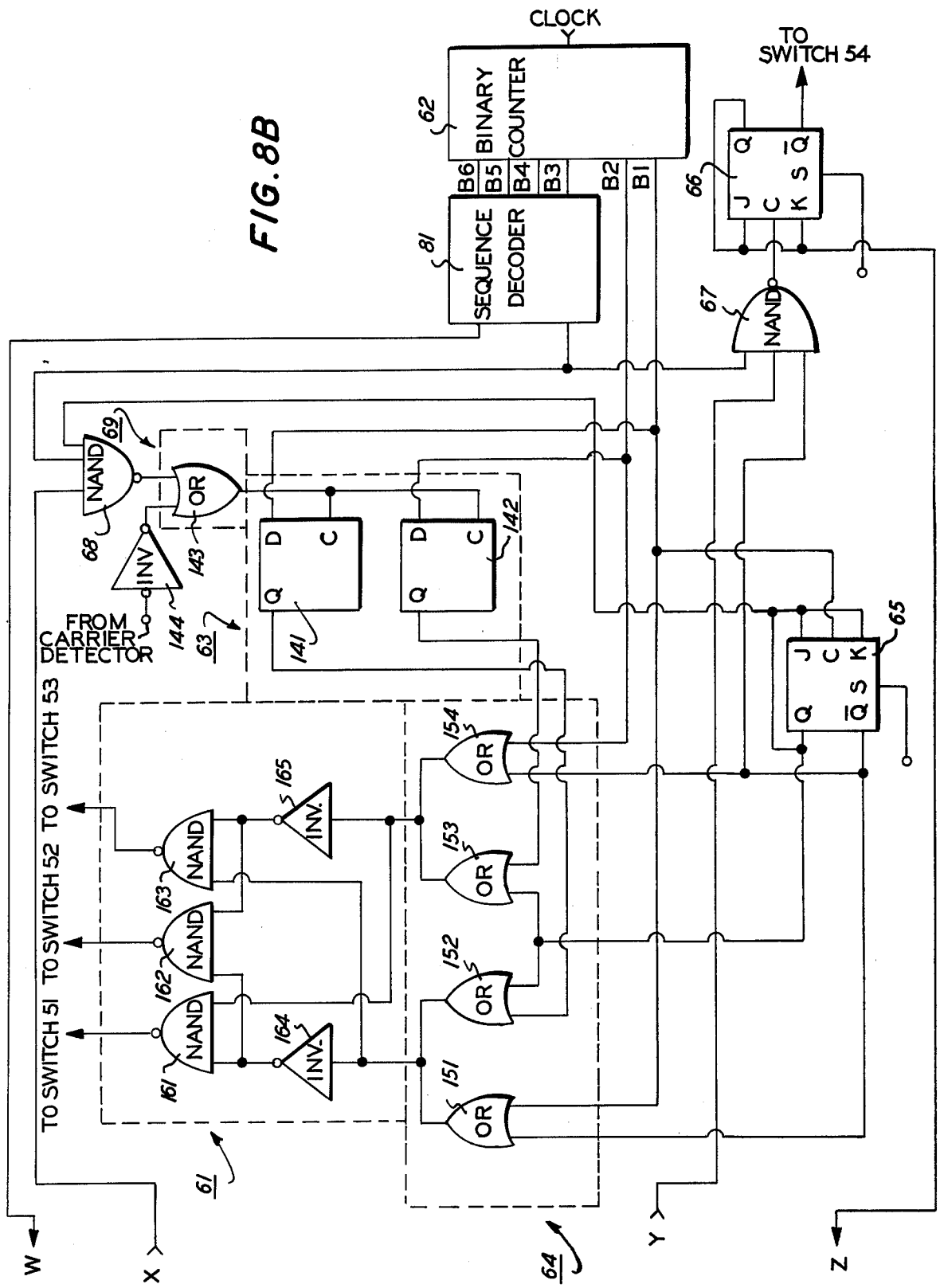

FIGS. 8A and 8B combine to illustrate a practical implementation of the controller 18 in substantial detail. A description of this exemplary embodiment follows in the interest of completeness, but it is re-emphasized that various changes could be made without departing from the present invention.

Focusing first on the peak detector 76, the output signal from the three-to-two level decoder 34 (FIG. 1), which has already been identified as having a negative polarity, is coupled through an appropriately poled diode 101 to charge a capacitor 102. The capacitor 102 is returned to a suitable source of reference potential (hereinafter referred to as ground), thereby completing the charging path. A pair of resistors 103 and 104 are coupled in parallel with the capacitor 102 to form a voltage divider, and the midpoint 105 of that divider is coupled by a weighting resistor 106 to the inverting input of an operational amplifier 107.

To establish a suitable time constant for the peak detector 76, the values of the capacitor 102 and the resistors 103, 104 and 106 are preferably selected to provide the capacitor 102 with a discharge time constant which is approximately twice as long as the period of the equalizer training pulses. The underlying rationale is to (1) allow the voltage on the capacitor 102 to decay between successive training pulses by an amount greater than the expected peak-to-peak variation in the amplitude of those pulses, but (2) maintain that voltage above the level of the normal inter-pulse noise. If those conditions are satisfied, the voltage developed across the capacitor 102 closely tracks the peak amplitude of the training pulses, whereby a current proportional to the peak amplitude of those pulses is applied with a negative polarity to the inverting input of the operational amplifier 107. All that remains, therefore, is to select the voltage dividing ratio of the resistors 103 and 104 and the value of the weighting resistor 106 to provide an appropriate voltage-to-current conversion ratio.

The inverter 77 comprises an operational amplifier 111 which is connected in parallel with the peak detector 76 to supply a positive polarity version of the equalizer training pulses for the switch 78 and the threshold detector 79. To that end, there is an input resistor 112 for applying the output signal of the three-to-two level decoder 34 to the inverting input of the operational amplifier 111 which, as shown, has its non-inverting input grounded and its output returned to its inverting input via a feedback resistor 113.

As illustrated, the switch 78 is a field effect transsistor 114 which has its source coupled to the output of the operational amplifier 111, its drain coupled to the inverting input of the operational amplifier 107 by a weighting resistor 115, and its gate coupled to the output of the threshold detector 79 by a current limiting resistor 116, and to the anode of the diode 82. If the diode 82 is forwardly biased, the field effect transistor 114 is maintained in a non-conductive state independently of the threshold detector 79. Therefore, for the time being it will be assumed that the diode 82 is reversely biased so that the construction and operation of the threshold detector 79 may be put into perspective.

Turning to the threshold detector 79, it will be seen that there is an open loop operational amplifier 121 which has its inverting input coupled to the output of an operational amplifier 111 by an input resistor 122 and its non-inverting input coupled to the midpoint 123 of a voltage divider comprising a pair of resistors 124 and 125 which are connected across a suitable bias supply source. Hence, the non-inverting input of the operational amplifier 121 is maintained at a predetermined threshold level, whereby the operational amplifier 121 operates in an inverting mode or a non-inverting mode to switch the field effect transistor 114 out of or into conduction depending on whether the output voltage of the operational amplifier 111 is above or below, respectively, the threshold level. The threshold level for the operational amplifier 121 is, of course, selected so that the field effect transistor 114 is switched into and out of conduction to supply the inverting input of the operational amplifier 107 with a positive polarity current proportional to the rectified ripple of the equalizer training pulses.

The summing node 74 comprises the weighting resistors 106 and 115 which lead to a common junction at the inverting input of the operational amplifier 107 which, in turn, is included in the integrator 75 to perform the weighted peak-to-average rectified ripple measurements used to identify the optimum delay network 43-46 and the average peak amplitude measurement used to determine whether the attenuation network 47 is called for or not.

To carry out those functions, the operational amplifier 107 has its non-inverting input returned to ground through a drift stabilizing resistor 126 and its output connected to its inverting input by an integrating capacitor 126. Moreover, since a series of more or less independent measurements are to be made, there is a field effect transistor 128 with its source-drain circuit connected across the capacitor 127 and its gate coupled by a current limiting resistor 129 to receive the dump signals supplied by the sequence decoder 81. Consequently, the field effect transistor 128 is periodically switched into conduction in response to the dump signals, thereby providing a path for rapidly discharging the capacitor 127.

The inputs of the storage comparator 71 and of the amplitude comparator 72 are coupled in parallel to the output of the operational amplifier 107. However, the amplitude comparator 72 is disabled during the first part of the equalizer adjustment period while the optimum delay network 43–46 is being identified under the control of the storage comparator 71.

Concentrating on the storage comparator 71, there is an operational amplifier 131 which has its inverting input returned to ground by a storage capacitor 132 and its non-inverting input coupled to the output of the operational amplifier 107. A diode 133 is connected between the inverting input of the operational amplifier 131 and the output of the carrier detector 32 (FIG. 1). Under quiescent conditions, the diode 133 is forwardly biased because of the low ("0") logic level signal appearing at the output of the carrier detector 32. Accordingly, the storage capacitor 132 is then maintained in a discharged state. When, however, carrier energy is detected, the output of the carrier detector 32 goes to a high ("1") logic level, thereby causing the diode 133 to be reversely biased by the voltage developed across a voltage dropping resistor 134 so that the storage capacitor 132 is then free to accumulate a charge.

To identify the optimum delay network 43, 44, 45 or 46 (FIG. 2), provision is made for causing the capacitor 132 to track and store the peak output voltage supplied by the integrator 75 while the delay networks 43–46 are being tested. To that end, there is a field effect transistor 135 which has its source coupled to the output of the operational amplifier 107, its drain coupled to the inverting input of the operational amplifier 131, and its gate coupled to the output of the operational amplifier 131 by a feedback resistor 136. Consequently, if the output voltage of the operational amplifier 107 exceeds the voltage on the capacitor 132, the operational amplifier 131 operates in a non-inverting mode, thereby switching the field effect transistor 135 into conduction so that the capacitor 132 quickly charges to the higher voltage level. Conversely, if the voltage on the capacitor 132 exceeds the output voltage of the operational amplifier 107, the operational amplifier 131 operates in a non-inverting mode, thereby maintaining the field effect transistor 135 in a non-conductive state. In short, the capacitor 132 stores the largest weighted peak-to-average rectifier ripple difference measurement obtained from the integrator 107 while the delay networks 43–46 are being serially tested so that the operating mode of the operational amplifier 131 indicates for each of the delay networks 43–46 whether that particular delay network does or does not outperform the delay networks which have been previously tested in terms of the phase compensation provided for the equalizer training pulses.

The indication of relative performance provided by the storage comparator 71 is digitized for application to the NAND gate 68. For that purpose, in keeping with conventional practices, the output of the operational amplifier 131 is coupled to a series resistor 137 which, in turn, is shunted to ground through a reversely poled diode 138 and strapped to a suitable logic level supply source by a forwardly poled diode 139. As a result, the input signal for the NAND gate 68 is held at a high ("1") or a low ("0") logic level depending on whether the operational amplifier 131 is operating in its non-inverting mode or its inverting mode, respectively. That, of course, means that the NAND gate 68 is unconditionally enabled, except when there is reason to update the memory 63.

Turning to the memory 63, the more significant output bits B1 and B2 (FIG. 9) of the counter 62 are applied to the data inputs of separate D-type latches 141 and 142, respectively, which are clocked under the control of the data selector 69 so that the Q outputs of the latches 141 and 142 are selectively updated to store the code for the optimum delay network 43, 44, 45 or 46. Suitably, the data selector 69 is an OR gate 143 having one input coupled to the output of the carrier detector 32 (FIG. 1) by an inverter 144 and another input coupled to the output of the NAND gate 68. In that event, the latches 141 and 142 are clocked when the OR gate 143 is disabled. However, the OR gate 143 is disabled only if the NAND gate 68 is disabled which means that (1) the flip-flop 65 must still be in its set state to confirm that the phase compensating stage 41 of the a equalizer 32 is in the process of being adjusted, (2) the output of the storage comparator 71 must be at a high ("1") logic level to confirm that a delay network 43, 44, 45 or 46 offering an increased level of phase compensation is being tested, and (3) a sampling signal must be present to confirm that it is time to make a decision. When all of those conditions are satisfied, the OR gate 143 clocks the latches 141 and 142, thereby causing the existing logic levels of the bits B1 and B2 to be transferred to the data outputs Q of the latches 141 and 142 for retention purposes.

The data multiplexer 64 suitably comprises a group of OR gates 151–154 which are paired for control by the flip-flop 65 to selectively apply the codes appearing at the more significant outputs of the counter 62 or at the Q outputs of the latches 141 and 142 to the data decoder 61. That is, the OR gates 151 and 154 each have one input coupled to the $\overline{Q}$ output of the flip-flop 65, whereby those gates are unconditionally enabled when the flip-flop 65 is in its reset state. In contrast, the OR gates 152 and 153 each have one input coupled to the Q output of the flip-flop 65 so that they are unconditionally enabled when the flip-flop 65 is in its set state. Therefore, the OR gates 151 and 154 have further inputs connected to receive the more significant output bits B1 and B2, respectively, from the counter 62, whereby those bits define the input codes for the data decoder 61 while the delay networks 43–46 are being tested. On the other hand, the OR gates 152 and 153 having their other inputs connected to the Q outputs of the latches 141 and 142, respectively, so that the stored code is applied to the data decoder 61 once the optimum delay network 43, 44, 45 or 46 has been identified.

A set of NAND gates 151–163 are included in the data decoder 61 of this embodiment for controlling the switches 51–53 (FIG. 2), respectively, in response to the code selected by the data multiplexer 64. As will be recalled, the function of the NAND gates 161–163 is to insert one or the other of the delay networks 43–46 into the passband signal path of the equalizer 32 as dictated by a corresponding series of codes represented by logic levels of 00, 01, 10, and 11. For that reason, the NAND gate 161 has one input connected in common to the outputs of the OR gates 151 and 152 via an inverter 164 and another input connected in common to the outputs of the OR gates 153 and 154. Thus, the NAND gate 161 is disabled to close the switch 51 in response to the "01" code, but is otherwise enabled to hold the switch 51 in an open circuit condition. Likewise, the NAND gate 162 is supplied with an inverted version of the selected code by a pair of inverters 164 and 165, whereby the NAND gate 162 is disabled to close the switch 52 only if the "00" code is present. A similar analysis would show that the NAND gate 163 closes the switch 53 in response to the "10" code. Hence, the "11" code results in all of the switches 51–53 being open circuited such that the passband signal is then routed through the delay network 46.

Figure 9:
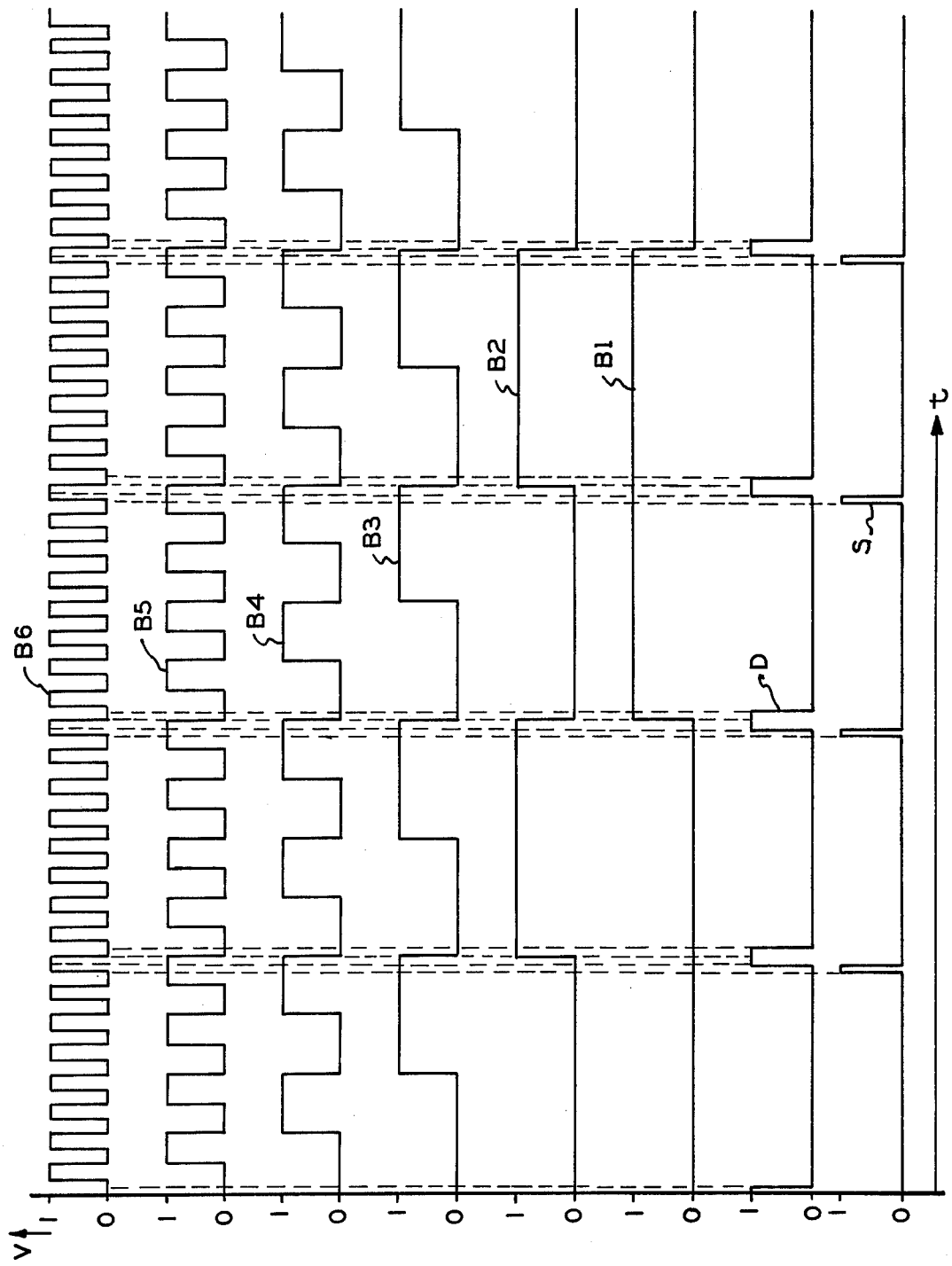
FIG. 9 is a more detailed timing diagram for the controller.

The sequence decoder 81 is not shown in detail because entirely conventional logic may be utilized to generate the sampling signal S and the dump signal D in response to the less significant output bits B3–B6 of the counter 62. However, FIG. 9 illustrates a typical relationship of those signals as a function of time.

Returning to the amplitude comparator 72, there is an open loop operational amplifier 171 which is switched from a non-inverting mode of operation to an inverting mode of operation when the flip-flop 65 is clocked into its reset state and which is then subject to being switched back into its non-inverting mode of operation under the control of the integrator 75 should it be found that the amplitude compensation offered by the attenuation network 47 (FIG. 2) is called for. As shown, the diode 82 has its anode connected to the gate of the field effect transistor 114 and its cathode coupled to the output of the operational amplifier 171 to the end that the diode 82 is forwardly biased when the amplifier 171 is operating in its inverting mode so that the field effect transistor 114 is then held in a non-conductive state independently of the threshold detector 71. The integrator 72 is, therefore, available not only for measuring the weighted peak-to-average rectified ripple difference of the training pulses while the phase compensating stage 41 of the equalizer 32 is being adjusted, but also for measuring the average peak amplitude of the training pulses while the amplitude compensating stage 42 is being adjusted.

More particularly, the inverting input of the operational amplifier 171 is coupled to the midpoint 172 of a voltage divider comprising a pair of resistors 173 and 174 which are connected between a bias supply source and ground, and the midpoint 172 of the divider 173, 174 is coupled to the Q output of the flip-flop 65 via an inverter 175. The non-inverting input of the operational amplifier 171 is, in turn, coupled to the midpoint 176 of a second voltage divider comprising another pair of resistors 177 and 178 which are connected between the bias supply source and the output of a second inverter 179. The input for the inverter 179 comes from the Q output of the flip-flop 65, and the output of the integrator 75 is fed into a junction between the output of the inverter 179 and the resistor 178 by another resistor 181.

As will be appreciated, the inverters 175 and 179 maintain the operational amplifier 171 in its non-inverting mode while the phase compensating stage 41 of the equalizer 32 is being adjusted inasmuch as the flip-flop 65 is held in its set state. Specifically, there then are low ("0") logic level signals at the outputs of the inverters 175 and 179, whereby the operational amplifier 171 has its non-inverting input at some positive voltage level, as determined by the divider 177, 178, while its non-inverting input is virtually grounded. However, when the flip-flop 65 is clocked into its reset state in preparation for adjusting the amplitude compensating stage 42, the outputs of the inverters 175 and 179 to go to high ("1") logic levels. When that occurs, the inverting input of the operational amplifier 171 is held at a predetermined reference level by the voltage divider 173, 174 so that the operational amplifier 171 then operates in its inverting or non-inverting mode depending on whether the voltage applied to its non-inverting input is above or below that reference level. Of course, the voltage applied to that input corresponds to but exceeds the voltage at the output of the integrator 75 by an amount equal to the voltage drop across the resistors 178 and 181. Accordingly, that differential should be taken into account in selecting the dividing ratio of the resistors 173 and 174 to establish an appropriate reference level.

To digitize the output of the operational amplifier 171 for application to the NAND gate 67, there once again is a resistor 182 which is shunted to ground by a reversely poled diode 183 and strapped to a suitable logic level supply source by a forwardly poled diode 184. It, therefore, follows that there is a low ("0") logic level input signal for unconditionally enabling the NAND gate 67 when the operational amplifier 171 is operating in its inverting mode. However, when the operational amplifier 171 is operating in its non-inverting mode, the NAND gate 67 is subject to being enabled in response to the sampling signal S supplied by the sequence decoder 81, provided that the flip-flop 65 is in its reset state. In short, the flip-flop 66 is clocked into its reset state to insert the attenuation network 47 into the passband signal path of the equalizer 32 only if (1) the flip-flop 65 is in its reset state to confirm that the attenuation stage 42 is being adjusted, (2) the operational amplifier 171 is operating in its non-inverting mode to confirm that the average peak amplitude of the baseband training pulses exceeds a predetermined reference level, and (3) a sampling pulse S is present to confirm that it is time to make a decision.

CONCLUSION

In view of the foregoing, it will now be understood that the present invention provides a reliable method and means for adjusting an adaptive equalizer on a single pass. Additionally, it will be evident that the invention also provides an improved method and means for measuring envelope delay distortion.

What is claimed is:

1. An adaptive equalizer for a receiving terminal of a data communication system configured to supply said receiving terminal with an input signal suffering from an unknown degree of distortion but containing a series of test pulses during a predetermined equalizer adjustment period;
  a predetermined number of compensating networks;
  means for serially generating an equal number of unique codes during said eualizer adjustment period, whereby each of said networks is uniquely identified by a respective one of said codes;
  switching means coupled to said networks and responsive to said codes for sequentially selecting successive ones of said networks to serve as a signal path for said test pulses on a trial basis;
  a memory coupled to receive said codes from said code generating means;
  means coupled between said signal path and said memory for identifying said selectively updating said memory to store the code for the network which most effectively compensates for the distortion suffered by said test pulses; and means coupled between said memory and said switching means for applying the stored code to said switching means after all of said networks have been tried, whereby the network which most effectively compensates for the distortion suffered by said test pulses is ultimately selected to serve as the signal path for said input signal.

2. The equalizer of claim 1 wherein said compensating networks have different phase versus frequency characteristics and are included to provide phase compensation for said input signal.

3. The equalizer of claim 2 wherein said input signal is expected to be suffering from a degree of phase distortion lying somewhere within a predetermined range, and the phase versus frequency characteristics of said compensating networks are selected to complementarily span said range.

4. The equalizer of claim 2 wherein said communication system further includes a limited bandwidth transmission channel for applying said input signal to said receiving terminal, whereby said test pulses each characteristically comprise a main lobe and a bipolar ripple component; and said means for selectively updating said memory includes means for performing a series of weighted peak amplitude-to-average rectified ripple difference measurements on said test pulses while successive ones of said compensating networks are serving as the signal path for said test pulses on a trial basis, and means for signalling said memory to store the code for the compensating network yielding the largest weighted peak-to-average rectified ripple difference.

5. The equalizer of claim 4 wherein the weighted peak-to-average rectified ripple difference measurement for each of said compensating networks is based on several test pulses, thereby including errors attributable to ordinary noise.

6. The equalizer of claim 5 wherein the average rectified ripple component of said test pulses is given approximately five times as much weight as the peak amplitude in performing said measurements.

7. The equalizer of claim 4 wherein said means for signalling said memory comprises a storage comparator including means for tracking and storing the largest weighted peak-to-average rectified ripple difference measurement previously obtained, thereby providing a dynamic reference against which subsequent weighted peak-to-average rectified ripple difference measurements are compared.

8. The equalizer of claim 7 wherein said test pulses have a predetermined repetition rate, and said codes are serially generated at an appreciably lower rate, whereby several test pulses are allotted to the trial of each of said compensating networks; and said equalizer further includes integrating means coupled between said measuring means and said signalling means for supplying said signalling means with an integrated weighted peak-to-average rectified ripple difference measurement for each of said compensating networks, whereby errors caused by ordinary noise tend to be averaged out.

9. The equalizer of claim 2 wherein said communications system further includes a limited bandwidth transmission channel for applying said input signal to said receiving terminal, whereby said test pulses each characteristically comprise a main lobe and a bipolar ripple compound; and said equalizer further includes an amplitude compensating stage comprising an attenuation network having a predetermined gain versus frequency characteristic, and a second switching means for selectively connecting said attenuation network in series with said signal path; and comparator means coupled between said signal path and said second switching means for signalling said second switching means to connect said attenuation network in series with said signal path if the average peak amplitude of test pulses received after said most effective compensating network has been selected exceeds a predetermined reference level.

10. The equalizer of claim 9 wherein said means for selectively updating said memory includes means for performing a series of weighted peak amplitude-to-average rectified ripple difference measurements on said test pulses while successive ones of said compensating networks are serving as the signal path for said test pulses on a trial basis, and means for signalling said memory to store the code for the compensating network which maximizes said weighted peak-to-average rectified ripple difference.

11. The equalizer of claim 10 wherein said test pulses have a predetermined repetition rate, and said codes are serially generated at an appreciably lower rate, whereby several test pulses are allotted to the trial of each of said compensating networks; and said equalizer further includes integrating means coupled between said measuring means and said signalling means for integrating the weighted peak-to-average rectified ripple difference measurement for each of said compensating networks over said several test pulses, thereby tending to average out any noise induced errors.

12. The equalizer of claim 11 wherein said means for signalling said memory comprises a storage comparator including means for tracking and storing the largest weighted peak-to-average rectified ripple difference measurement previously obtained, thereby providing a dynamic reference against which subsequent weighted peak-to-average rectified ripple difference measurements are compared.

13. The equalizer of claim 12 wherein the average rectified ripple component of said test pulses is given approximately five times as much weight as the peak amplitude in performing said measurements.

14. In a receiving terminal for an analog data communication system which relies on a limited bandwidth, switched transmission medium for supplying said receiving terminal with a modulated, passband input signal suffering from an unknown degree of transmission distortion;

said input signal including a series of test pulses during a predetermined equalizer adjustment period; and said receiving terminal including means for demodulating said input signal, whereby a baseband version of said training pulses is recovered:

the improvement comprising an adaptive equalizer having a plurality of available settings, said equalizer being connected to feed said input signal to said demodulating means; and control means coupled between said demodulating means and said equalizer for identifying and selecting the setting which causes said equalizer to best compensate for said transmission distortion on the basis of only one test pass through the available settings and in response to the baseband version of said test pulses.

15. The improvement of claim 14 wherein
said equalizer comprises a plurality of delay networks having different phase versus frequency characteristics, and switching means coupled to said delay networks for inserting a selected one of said networks in series with said demodulating means; and said control means comprises means for serially generating an equal plurality of unique codes during said equalizer adjustment period, whereby each of said delay networks is uniquely identified by an associated code, decoder means for driving said switching means in response to said codes, a memory for storing a selected one of said codes, multiplexer means for supplying said decoder means with said plurality of codes during a first part of said equalizer adjustment period and with said selected code during a second part of said period, whereby said delay networks are sequentially inserted in series with said demodulating means on a trial basis during the first part of said period and a selected one of said delay networks is maintained in series with said demodulating means during the second part of said period, and means coupled between said demodulating means and said memory for selectively updating said memory during the first part of said period to store the code for the delay network which is found to most effectively compensate for the distortion suffered by said test pulses, whereby the most effective of said delay networks is selected during the second part of said period.

16. The improvement of claim 15 wherein said means for selectively updating said memory includes means for performing a series of weighted peak amplitude-to-average rectified ripple difference measurements on said test pulses while successive ones of said compensating networks are serving as the signal for said test pulses on a trial basis, and means for signalling said memory to store the code for the compensating network which maximizes said weighted peak-to-average rectified ripple difference.

17. The improvement of claim 16 wherein said test pulses have a predetermined repetition rate, and said codes are serially generated at an appreciably lower rate, whereby several test pulses are allotted to the trial of each of said compensating networks; and said control means further includes integrating means coupled between said measuring means and said signalling means for integrating the weighted peak-to-average rectified ripple difference measurement for each of said compensating networks over said several test pulses, thereby tending to average out any noise induced errors.

18. The improvement of claim 17 wherein said system is an analog facsimile system.

19. The improvement of claim 18 wherein the average rectified ripple component of said test pulses is given approximately five times as much weight as the peak amplitude in performing said measurement.

20. The improvement of claim 17 wherein said equalizer further includes an amplitude compensating stage comprising an attenuation network having a predetermined gain versus frequency characteristic, and a second switching means for selectively connecting said attenuation network in series with said signal path; and said control means further includes, comparator means coupled between said signal path and said second switching means for signalling said second switching means to connect said attenuation network in series with said signal path if the average peak amplitude of test pulses received after said most effective compensating network has been selected exceeds a predetermined reference level.

21. The improvement of claim 20 wherein said system in an analog facsimile system.

* * * * *